United States Patent [19]
Anderson

[11] 4,290,631
[45] Sep. 22, 1981

[54] SUBMARINE PIPE CONSTRUCTION

[75] Inventor: J. Hilbert Anderson, York, Pa.

[73] Assignee: Sea Solar Power, York, Pa.

[21] Appl. No.: 27,915

[22] Filed: Apr. 6, 1979

[51] Int. Cl.³ .............................................. F16L 39/00
[52] U.S. Cl. ................................ 285/137 A; 138/111;
285/397
[58] Field of Search ............... 285/137 A, 137 R, 397;
138/112, 111

[56] References Cited
U.S. PATENT DOCUMENTS

| | | | |
|---|---|---|---|
| 2,443,295 | 6/1948 | Bisch | 138/112 X |
| 3,100,529 | 8/1963 | McStravich et al. | 138/112 X |
| 3,538,955 | 11/1970 | Anderson | 137/236 X |
| 3,822,903 | 7/1974 | McNeely et al. | 285/137 R |

Primary Examiner—Thomas F. Callaghan
Attorney, Agent, or Firm—Kemon and Estabrook

[57] ABSTRACT

A plurality of sealed tubes, pipes or the like constituting the wall of a relatively large diameter pipe that is susceptible of being submerged and which has buoyant or semibuoyant walls. The tubes or pipes are arranged parallel to one another in a circular pattern with their axes parallel to the axis of the large diameter pipe and said tubes are sealed to one another along their length. A suitable clamping device is positioned upon said tubes or pipes to prevent them from collapsing over each other which acts as a positive stabilizer while maintaining said tubes or pipes in alignment in a circle.

10 Claims, 5 Drawing Figures

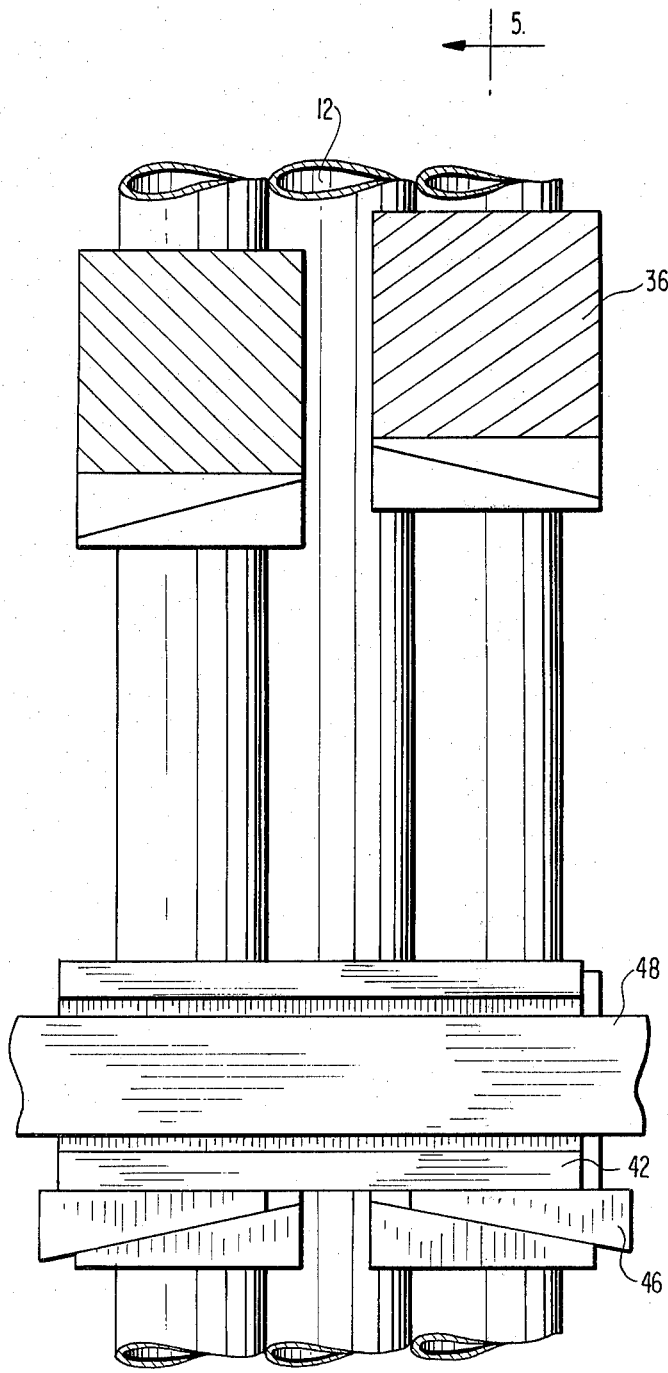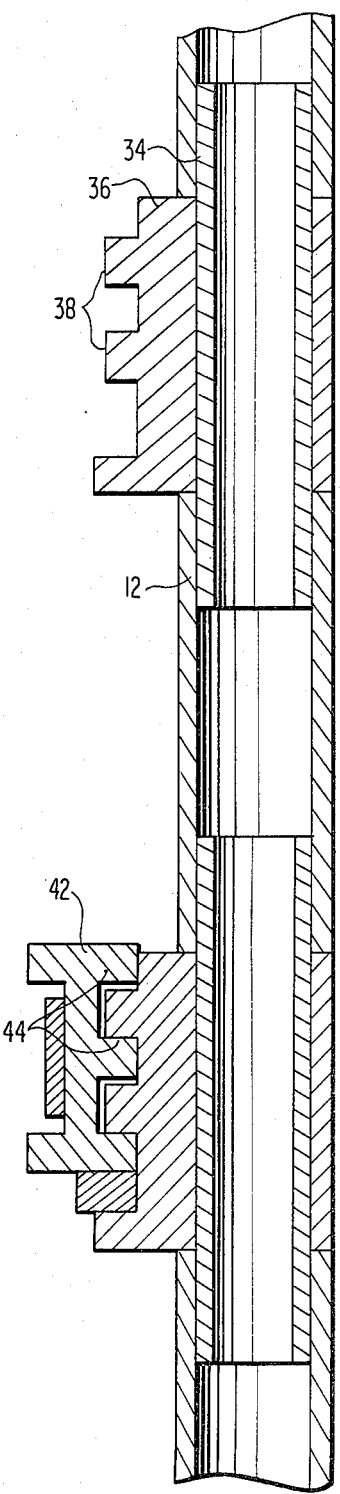
FIG 4
FIG 5

SUBMARINE PIPE CONSTRUCTION

BACKGROUND OF THE INVENTION

The present invention is directed to a tubular conduit or the like fabricated from a plurality of tubes or pipes.

There is disclosed in Applicant's prior U.S. Pat. No. 3,538,955 dated Nov. 10, 1970, the concept of suspended submarine pipe consisting of a plurality of small tubes or pipes that are so assembled and joined to one another as to form a relatively large diameter pipe. In said patent the wall of the large diameter pipe is constructed from a plurality of sealed tubes or pipes arranged parallel to each other with their axes parallel to the axis of the large pipe and sealed to one another along their lengths. The small tubes or pipes are provided with an encircling stiffening ring for the purpose of keeping said tubes and pipes in alignment in a circle.

When the large pipe is submerged and supported from its upper end the buoyant force, as produced by the small tubes or pipes, reduces the tensile stresses in the pipe wall. The buoyancy of the small tubes or pipes may be varied by varying the density of the material in the tubes as by filling the tubes with gases.

SUMMARY OF THE INVENTION

The present invention is directed to an improvement in the submarine pipe construction as embodied in the aforementioned patent. It has been determined that the use of a rigid encircling stiffening ring for keeping the tubes or pipes in alignment in a circle has some particular disadvantages. It is difficult to make a rigid encircling stiffening ring that has considerable system stiffness while at the same time holding the circle of tubes or pipes in compression. It would be highly more desirable to merely put a tension band around the circle of tubes or pipes in order to keep them in compression and tightly pressed together so as to minimize the possibility of leakage into the pipe through the joints between the separate tubes or pipes.

Such an arrangement, however, raises the problem of maintaining alignment of the tubes or pipes if they are placed in compression merely by a tension band. One of the reasons or problems is that a row of tubes or pipes forced against one another form a rather unstable column, and, thus, are likely to slip past each other with some of the tubes or pipes moving inward toward the center of the circle while adjacent tubes or pipes moving outward away from the circle. Thus, it becomes necessary to provide for a positive stabilizing device that will preclude the tubes or pipes from collapsing over each other and which will maintain them in alignment in the circle.

In addition to the foregoing it is highly desirable to be able to transmit vertical shear forces from one of the tubes or pipes to an adjacent tube or pipe. The embodiment of shear joints between the tubes or pipes assures a stronger overall pipe construction in bending. The present invention is directed to means for such shear joints between adjacent tubes or pipes with the shear joints being easily adjustable to line up with joints between the ends of adjacent tubes or pipes.

A further problem in the manufacture of the relatively large diameter pipe from a plurality of small tubes or pipes arises due to the tolerances in the lengths of the available tubes or pipes. In order to allow for slight variations in lengths of the pipes, without the necessity of extremely accurate machining so as to maintain all the tubes and pipes at exactly the same length, it is contemplated to have a joint between the tubes and pipes constructed so as to allow for slight variations in the lengths of said tubes or pipes. Thus, two adjacent tube or pipe joints do not have to be perfectly aligned with each other in fastening the shear joint to them.

BRIEF DESCRIPTION OF THE DRAWING

FIG. 4 is an elevational view of a segment of tubes or pipes with a modified shear clamp mounted thereon; and FIG. 5 is a vertical sectional view of the modified shear clamp, the view being taken on the line 5—5 of FIG. 4.

DESCRIPTION OF THE PREFERRED EMBODIMENT

Figure 1:
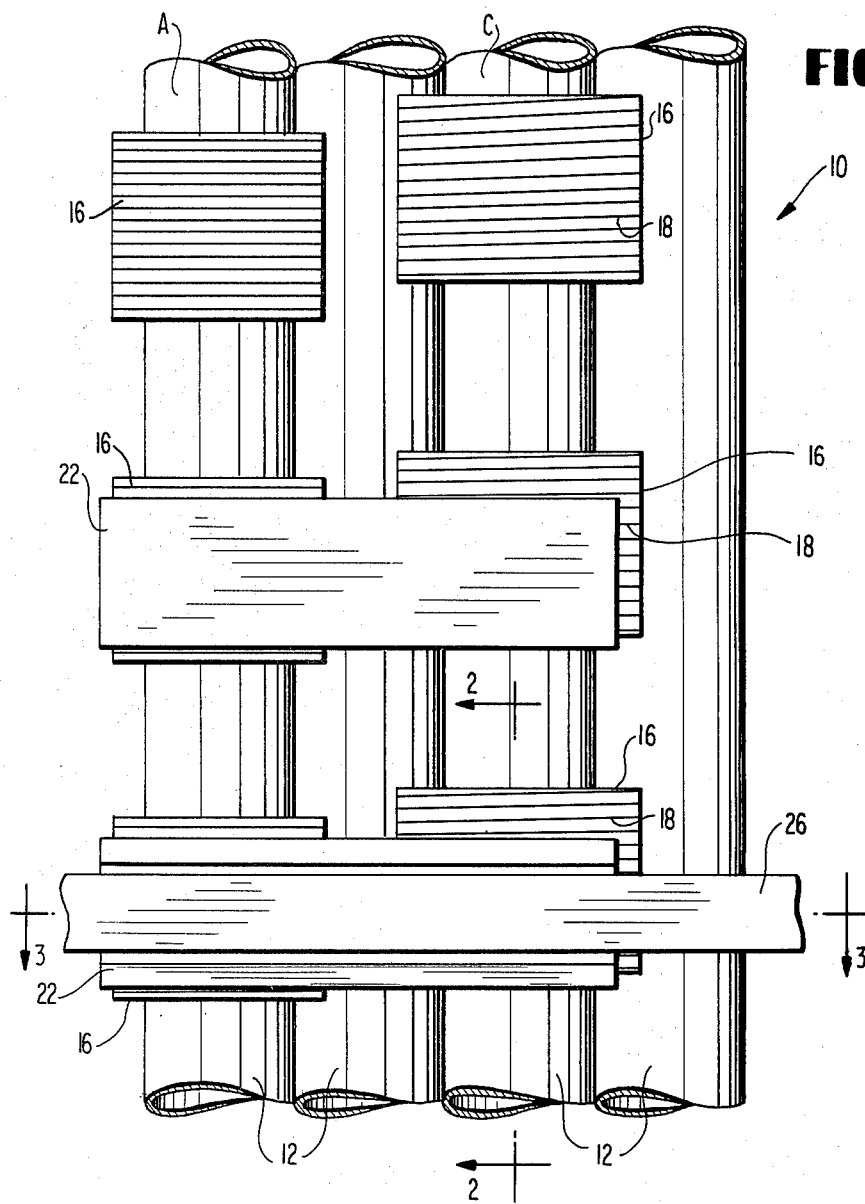
FIG. 1 is an elevational view of a segment of tubes or pipes of the submarine pipe construction of the present invention.

There is shown in FIG. 1 a segment of a submarine pipe 10 which is relatively flexible due to the manner of construction of the pipe wall. The pipe 10 embodies a plurality of parallel straight tubes or pipes 12 arranged with their vertical axes disposed in a circular pattern. The tubes or pipes 12 are connected together end-to-end by joints consisting of shear sleeves and clamps which tend to maintain the various tubes and pipes in alignment with one another while also retaining them in a continuous circle.

Figure 2:
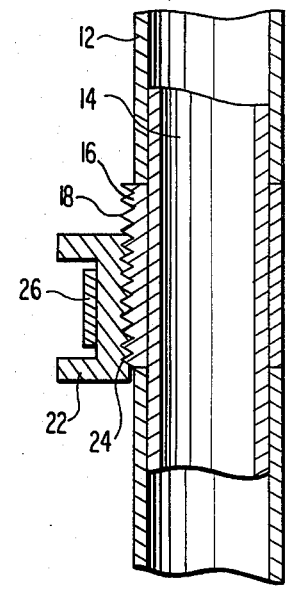
FIG. 2 is a vertical sectional view of a portion of a tube or pipe with a detail showing of a shear clamp of the present invention, the view being taken on line 2—2 of FIG. 1.
Figure 3:
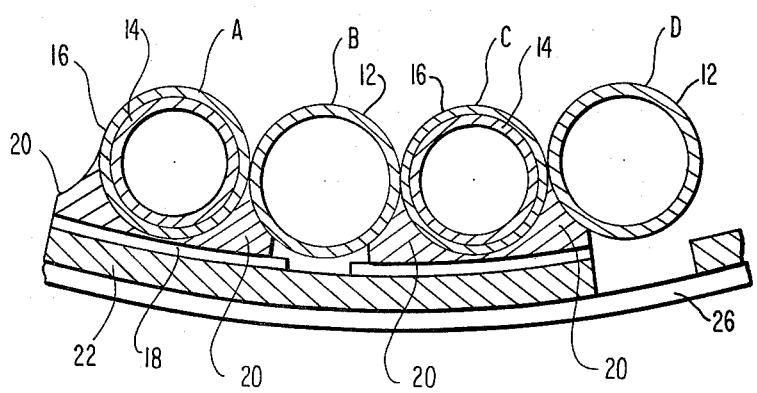
FIG. 3 is a horizontal sectional view of a plurality of tubes or pipes with shear clamp, the view being taken on line 3—3 of FIG. 1.

The joint or connection for securing the tubes or pipes 12 together and maintaining them in a continuous circle is shown for purposes of illustration in its various stages of assembly in FIG. 1. The tubes or pipes 12, which are designated "A" and "C", are each provided at their lower ends with an internally positioned inner tube or expansion sleeve 14, FIG. 2. The expansion sleeve 14 is also adapted to fit into the top or upper end portion of another section of the tube or pipe 12 so that said expansion sleeve acts as a connecting section between two longitudinally spaced tubes or pipes 12. The median portion of the expansion sleeve 14 is provided with a shear sleeve portion 16 that is formed with serrated teeth 18 on its external surface. The shear sleeve 16, as seen in FIG. 3, flares outwardly and terminates in enlarged end portions 20 which are of arcuate configuration for engagement with the next adjacent tube or pipe 12 designated "B". The other enlarged end portion 20 of the sleeve 16 is adapted to abut and engage in a similar manner the tube or pipe 12 that would be adjacent to and on the left of tube "A" in FIG. 3. In a similar manner the shear sleeve 16 on the tube or pipe designated "C" is provided with enlarged end portions 20 that abut and engage the tubes or pipes designated "B" and "D".

The shear sleeves 16 formed on tubes or pipes "A" and "C" are provided with a shear clamp 22 that is formed with an inner serrated surface 24 which fits against the serrated teeth or face 18 and thereby spans over the tubes or pipes "A" and "C". Thus the serrated surface 24 of the shear clamp 24 in spanning across the tubes or pipes "A", "B" and "C" and fitting into the serrated faces 18 of the two shear sleeves 16 tends to transmit shear in the longitudinal direction of the tubes or pipes 12 between the tubes or pipes "A" and "C". In addition such an arrangement maintains tube or pipe "B" in alignment with tubes or pipes "A" and "C" so that a succession of shear clamps 22 on alternate tubes or pipes, such as from tube or pipe "B" to tube or pipe "D", in effect makes a continuous alignment joint that maintains all of the tubes and pipes in a continuous circle so that they cannot get out of alignment due to the alternating shear sleeves encircling the entire circle of tubes and pipes 12. The shear clamps 22 are maintained in engagement with the shear sleeves 16 by means of a tension band 26 whereby the serrated surface 24 is retained in meshed engagement with the face 18 of the shear sleeve 16.

The shear sleeves 16 and shear clamps 22 tend to compensate for any small variation that might exist in the length of the tubes or pipes 12 thereby avoiding the necessity of having to machine said tubes or pipes so that they would all be exactly the same length. In FIG. 1 there is shown, for purpose of illustration, what could be considered the three stages of securing the tubes or pipes 12 in a circle and maintaining them in alignment. As shown in the upper portion of FIG. 1 the shear sleeve 16 on tube or pipe "A" is lower than the shear sleeve 16 on tube or pipe "C". The two shear sleeves 16 are still so positioned on the tubes or pipes "A" and "C" that the shear clamp 22 will overlie a portion of both sleeves 16 so that the serrated face 24 of the clamp 22 will engage some of the serrations 18 on the sleeves 16 in the manner as shown in the central portion of FIG. 1. Thus it is obvious that the shear sleeves 16 can be made long enough, in a vertical direction, to compensate for manufacturing tolerances in the length of the tubes or pipes 12. In order to have the shear clamp 22 fit or engage the shear sleeves 16 or a portion thereof, when one shear sleeve is offset from an adjacent horizontal shear sleeve, at least some of the serrations 18 in one of said shear sleeves 16 could be set at an angle, see sleeve 16 on tube "C" in upper part of FIG. 1, rather than being horizontal. Then by displacing the shear clamp 22 to the right or left with respect to said shear sleeves 16, said shear clamp 22 can then be so positioned that the serrated surface 24 would engage at least a portion of the serrated teeth 18 on the shear sleeve 16. This arrangement enables the serrated face 24 of the shear clamps 22 to be tightened into the serrations 18 of the sleeves 16 though said sleeves are not in the same vertical position with respect to one another. In this manner the positioning of the serrated face 24 of the shear clamp 22 with respect to the serrated surface 18 of the sleeve 16 can be varied for both large and small changes in vertical direction.

The foregoing permits the use of random lengths of tubes or pipes 12 for the construction of the submarine pipe 10 while at the same time maintaining a stable alignment of the tubes or pipes in the circle configuration. It also provides for a positive transmission of vertical shear forces from a tube or pipe 12 to every alternate tube or pipe, thereby adding considerably to the bending strength of the submarine pipe 10. The application of the tension band 26 to the shear clamps 22 maintains the entire structure of tubes or pipes 12 in tight assembly while minimizing the possibility of leakage between adjoining tubes or pipes 12. Any leakage between adjoining tubes or pipes 12 can be minimized by spraying a caulking compound or elastomer into the joint between adjacent pipes.

A variation or modification in the manner of applying the shear clamps to the shear sleeves is shown in FIGS. 4 and 5. The expansion sleeve 34 is provided with a shear sleeve 36 that has rectangularly shaped teeth or projections 38 formed on the outer face thereof which are engaged by complimentary teeth or projections 44 formed on the inner face of the shear clamp 42. In assembling the shear clamp 42 onto the rectangularly shaped teeth 38, in the manner as described with reference to FIG. 1, an additional advantage may be derived in that the shear clamp itself can be utilized to produce a tension between adjacent tubes or pipes, or, rather between every other tube or pipe, thereby compressing the intermediate tube or pipe between the adjacent tubes or pipes. The shear sleeves 36 with teeth or projections 38 on the face thereof are shown in the upper portion of FIG. 4 so that a shear clamp 42 may be applied to said teeth and a wedge 46 may then be inserted at the bottom of the shear sleeve 36 and shear clamp 43, FIGS. 4 and 5. This arrangement will force the shear clamp 42 with teeth or projections 44 upwardly against the lower faces of the teeth or projections on the shear sleeve 36 whereby the teeth or projections are pulled toward each other between the tubes or pipes so that tension is applied between alternate tubes or pipes by the shear clamp 42.

An advantage that can be obtained from the foregoing arrangement is that this type of shear clamp is easier to adjust and at the same time produces a high tensile force between the tubes or pipes 12 whereby the tension band 48 does not need to produce such a high tensile force on the whole system but rather can act merely as a retaining band. While some variations are possible in the construction as herein described, it is believed that the principle as shown is important in making a practical and easily constructed large submarine pipe that can utilize ordinary pieces of pipe in random lengths and can provide high bending and shear strength in the overall structure as well as tightness of the assembly that will minimize leaks in actual service.

I claim:

1. A large diameter pipe adapted to be submerged in a body of water in substantially a vertical direction, said pipe being constructed of a plurality of sections or segments of parallel hollow tubes or pipes arranged with their axes parallel to the axis of the pipe with the diameter of said tubes or pipes being less than the diameter of said pipe, an expansion sleeve positioned in the lower end of each tube of one section and in the upper end of each tube of the subjacent section for connecting and joining the ends of adjacent tubes, a shear sleeve segment provided on a portion of the external surface of said expansion sleeve, a shear clamp engaging said shear sleeves and tension means engaging said clamps for retaining them in engagement with said shear sleeves.

2. A large diameter pipe as set forth in claim 1 wherein said shear sleeves are formed with flared end portions that engage a portion of the adjacent tubes or pipes.

3. A large diameter pipe as set forth in claim 2 wherein the external surface of said shear sleeves are provided with serrated teeth.

4. A large diameter pipe as set forth in claim 3 wherein said shear clamps are formed with a serrated surface engagable with the serrated surface of said shear sleeves.

5. A large diameter pipe as set forth in claim 4 wherein a tension band engages said shear clamps for holding said serrated surfaces in engagement while making a continuous alignment joint contemporaneous with maintaining all of said tubes in a continuous circle.

6. A large diameter pipe as set forth in claim 3 wherein the shear sleeve of one expansion sleeve is offset vertically from an adjacent shear sleeve with the serrated surface of said offset sleeve being inclined with respect to the vertical axis of said expansion sleeve and the horizontal plane of the serrated surface of the adjacent shear sleeve with a shear clamp engaging the serrated surface of said sleeves to maintain a stable alignment of the tubes in said large diameter pipe.

7. A large diameter pipe as set forth in claim 3 wherein said expansion sleeves may be formed of varying vertical lengths to compensate for tubes of varying lengths with the serrated surfaces on the shear sleeves of said expansion sleeves having the serrations in a plane horizontal to the vertical axis of said expansion sleeves.

8. A large diameter pipe as set forth in claim 3 wherein said expansion sleeves may be formed of varying vertical length to compensate for tubes of varying length with the serrated surfaces on the shear sleeves of said expansion sleeves having the serrations in a plane inclined to the vertical axis of said expansion sleeve.

9. A large diameter pipe as set forth in claim 1 wherein the external surface of said shear sleeves are formed with rectangularly shaped teeth or projections engagably by complimentary shaped teeth or projections on said shear clamps.

10. A large diameter pipe as set forth in claim 9 wherein wedges are interposed between the rectangularly shaped teeth on said shear sleeves and those on said shear clamps to force the shear clamps upwardly against the shear sleeve teeth so as to apply tension between alternate tubes of said pipe.

* * * * *